(12) United States Patent
Muddamsetty et al.

(10) Patent No.: US 12,164,439 B1
(45) Date of Patent: Dec. 10, 2024

(54) HARDWARE ARCHITECTURE OF PACKET CACHE EVICTION ENGINE

(71) Applicant: Google LLC, Mountain View, CA (US)

(72) Inventors: Chandan Muddamsetty, San Jose, CA (US); Jiazhen Zheng, Santa Clara, CA (US); Weiwei Jiang, Santa Clara, CA (US); Shivang Ghetia, Wayne, NJ (US); Abhishek Agarwal, Santa Clara, CA (US); Srinivas Vaduvatha, San Jose, CA (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 18/327,962

(22) Filed: Jun. 2, 2023

(51) Int. Cl.
*G06F 12/12* (2016.01)
*G06F 12/123* (2016.01)
*G06F 12/126* (2016.01)

(52) U.S. Cl.
CPC .......... *G06F 12/126* (2013.01); *G06F 12/123* (2013.01)

(58) Field of Classification Search
CPC .......................... G06F 12/12–128; G06F 3/06
See application file for complete search history.

(56) References Cited

U.S. PATENT DOCUMENTS

| | | | |
|---|---|---|---|
| 6,766,419 B1 | 7/2004 | Zahir et al. | |
| 7,130,912 B2 | 10/2006 | Nishikado et al. | |
| 8,244,880 B2 | 8/2012 | Faucher et al. | |
| 8,812,817 B2 | 8/2014 | Fuller et al. | |
| 8,943,272 B2 | 1/2015 | Bell, Jr. et al. | |
| 8,966,184 B2 | 2/2015 | Atkisson | |
| 9,292,445 B2 | 3/2016 | Bronson et al. | |
| 9,355,036 B2 | 5/2016 | Beard et al. | |
| 10,102,150 B1 | 10/2018 | Visvanathan et al. | |
| 10,146,457 B2 * | 12/2018 | Pawlowski | G06F 3/0679 |
| 10,216,632 B2 | 2/2019 | Kass | |
| 10,417,134 B2 | 9/2019 | Faldu et al. | |
| 10,762,000 B2 | 9/2020 | Chang et al. | |
| 10,841,394 B2 | 11/2020 | Ideguchi et al. | |
| 10,915,461 B2 | 2/2021 | Ambroladze et al. | |
| 10,983,922 B2 | 4/2021 | Gupta et al. | |
| 11,301,394 B2 | 4/2022 | Gupta et al. | |
| 11,467,972 B2 | 10/2022 | Reed et al. | |
| 2017/0168944 A1 | 6/2017 | van Greunen et al. | |
| 2019/0273803 A1 | 9/2019 | Ideguchi et al. | |
| 2021/0124694 A1 | 4/2021 | Verplanken | |
| 2021/0185139 A1 | 6/2021 | Wang et al. | |

FOREIGN PATENT DOCUMENTS

| | | |
|---|---|---|
| CN | 105812285 A | 7/2016 |
| CN | 115934360 A | 4/2023 |

OTHER PUBLICATIONS

International Search Report and Written Opinion for PCT Application No. PCT/US2023/035581, dated Feb. 6, 2024. 13 pages.
Extended European Search Report for European Patent Application No. 23156266.1 dated Dec. 12, 2023. 8 pages.

* cited by examiner

*Primary Examiner* — Khoa D Doan
(74) *Attorney, Agent, or Firm* — Lerner David LLP

(57) ABSTRACT

Aspects of the disclosure are directed to a packet cache eviction engine for reliable transport protocols of a network. The packet cache eviction engine can manage on-chip cache occupancy by evicting lower priority packets to off-chip memory and ensuring that higher priority packets are kept on-chip to achieve higher performance and lower latency in processing packets in the network.

20 Claims, 9 Drawing Sheets

| Register name | Fields | Description |
|---|---|---|
| Eviction config register 302 | | |
| evict_cfg | evict_en | Enable bit for eviction. |
| | evict_thld_hi | When this threshold is met, the eviction engine can start evicting packets. |
| | evict_thld_lo | The eviction engine can continue to evict packets until the count falls below this threshold. |
| Priority Level config register 304 | | |
| pri_level_init_cfg | host_<n>_low | The initial value for a lowest priority level queue of a host. |
| | host_<n>_gap | The gap between adjacent priority level queues of a host. |
| pri_level_adj_cfg | case_<n>_inc | Increase the priority level of corresponding host/packet by the amount of case_<n>_adj_value if case_<n>_inc = 1. Otherwise, decrease the priority level by case<n>_adj_value if case_<n>_inc = 0. |
| | case_<n>_adj_value | |

HARDWARE ARCHITECTURE OF PACKET CACHE EVICTION ENGINE

BACKGROUND

On-chip cache buffer space and off-chip memory bandwidth are critical resources for a network interface card of a network utilizing reliable transport protocols. Improper usage of these resources can lead to lower performance and higher latency for processing packets in the network. Lower priority packets should be evicted to the off-chip memory while high priority packets should be stored in the on-chip cache. Managing the evicting and storage of packets in the on-chip cache can be difficult given the complex nature of the network.

BRIEF SUMMARY

Aspects of the disclosure are directed to a packet cache eviction engine for reliable transport protocols of networks. The packet cache eviction engine can be modular, programmable, area efficient, and/or effectively manage on-chip buffer usage. The packet cache eviction engine can allow for higher performance and lower latency for a network utilizing the reliable transport protocols.

An aspect of the disclosure provides for a method for evicting packets from an on-chip cache to off-chip memory, the method including: determining, by one or more processors, an occupancy counter of the on-chip cache is above a first threshold; selecting, by the one or more processors, a queue having a lowest priority from a plurality of queues, each queue of the plurality of queues having a configurable priority; removing, by the one or more processors, a packet from a head of the selected queue to evict the packet from the on-chip cache; and reducing, by the one or more processors, the occupancy counter based on a length of the packet being removed.

In an example, the method further includes: determining, by the one or more processors, the occupancy counter is below a second threshold; and stopping, by the one or more processors, eviction of packets from the on-chip cache. In another example, the first threshold and the second threshold are equivalent. In yet another example, the occupancy counter tallies a total packet length of packets being stored in the on-chip cache. In yet another example, the method further includes: selecting, by the one or more processors, multiple queues having the lowest priority; and selecting, by the one or more processors, a queue of the multiple queues based on a round-robin.

In yet another example, the method further includes: installing, by the one or more processors, a packet to a queue; and increasing, by the one or more processors, the occupancy counter based on a length of the packet being installed. In yet another example, the method further includes: deallocating, by the one or more processors, a packet from a queue; and reducing, by the one or more processors, the occupancy counter based on a length of the packet being deallocated.

In yet another example, the method further includes updating, by the one or more processors, a priority for a packet by: deleting the packet from a first queue; determining an updated priority for the packet using a configurable register; mapping the updated priority to a second queue associated with the updated priority; and installing the packet in the second queue. In yet another example, the method further includes updating, by the one or more processors, priorities for multiple queues by: reading the priorities from a priority map table; determining updated priorities using a configurable register; and writing the updated priorities to the priority map table.

In yet another example, the queue is implemented as a double linked list.

Another aspect of the disclosure provides for a system including: one or more processors; and one or more storage devices coupled to the one or more processors and storing instructions that, when executed by the one or more processors, cause the one or more processors to perform operations for evicting packets from an on-chip cache to off-chip memory, the operations including: determining an occupancy counter of the on-chip cache is above a first threshold; selecting a queue having a lowest priority from a plurality of queues, each queue of the plurality of queues having a configurable priority; removing a packet from a head of the selected queue to evict the packet from the on-chip cache; and reducing the occupancy counter based on a length of the packet being removed.

In an example, the operations further include: determining the occupancy counter is below a second threshold; and stopping eviction of packets from the on-chip cache. In another example, the operations further include: selecting multiple queues having the lowest priority; and selecting a queue of the multiple queues based on a round-robin.

In yet another example, the operations further include: installing a packet to a queue; and increasing the occupancy counter based on a length of the packet being installed. In yet another example, the operations further include: deallocating a packet from a queue; and reducing the occupancy counter based on a length of the packet being deallocated.

In yet another example, the operations further include updating a priority for a packet by: deleting the packet from a first queue; determining an updated priority for the packet using a configurable register; mapping the updated priority to a second queue associated with the updated priority; and installing the packet in the second queue. In yet another example, the operations further include updating priorities for multiple queues by: reading the priorities from a priority map table; determining updated priorities using a configurable register; and writing the updated priorities to the priority map table.

Yet another aspect of the disclosure provides for a non-transitory computer readable medium for storing instructions that, when executed by one or more processors, cause the one or more processors to perform operations for evicting packets from an on-chip cache to off-chip memory, the operations including: determining an occupancy counter of the on-chip cache is above a first threshold; selecting a queue having a lowest priority from a plurality of queues, each queue of the plurality of queues having a configurable priority; removing a packet from a head of the selected queue to evict the packet from the on-chip cache; and reducing the occupancy counter based on a length of the packet being removed.

In an example, the operations further include: determining the occupancy counter is below a second threshold; and stopping eviction of packets from the on-chip cache. In another example, the operations further include: selecting multiple queues having the lowest priority; and selecting a queue of the multiple queues based on a round-robin.

BRIEF DESCRIPTION OF THE DRAWINGS

FIG. 3 depicts a table of example configurable registers according to aspects of the disclosure.

DETAILED DESCRIPTION

Figure 1:
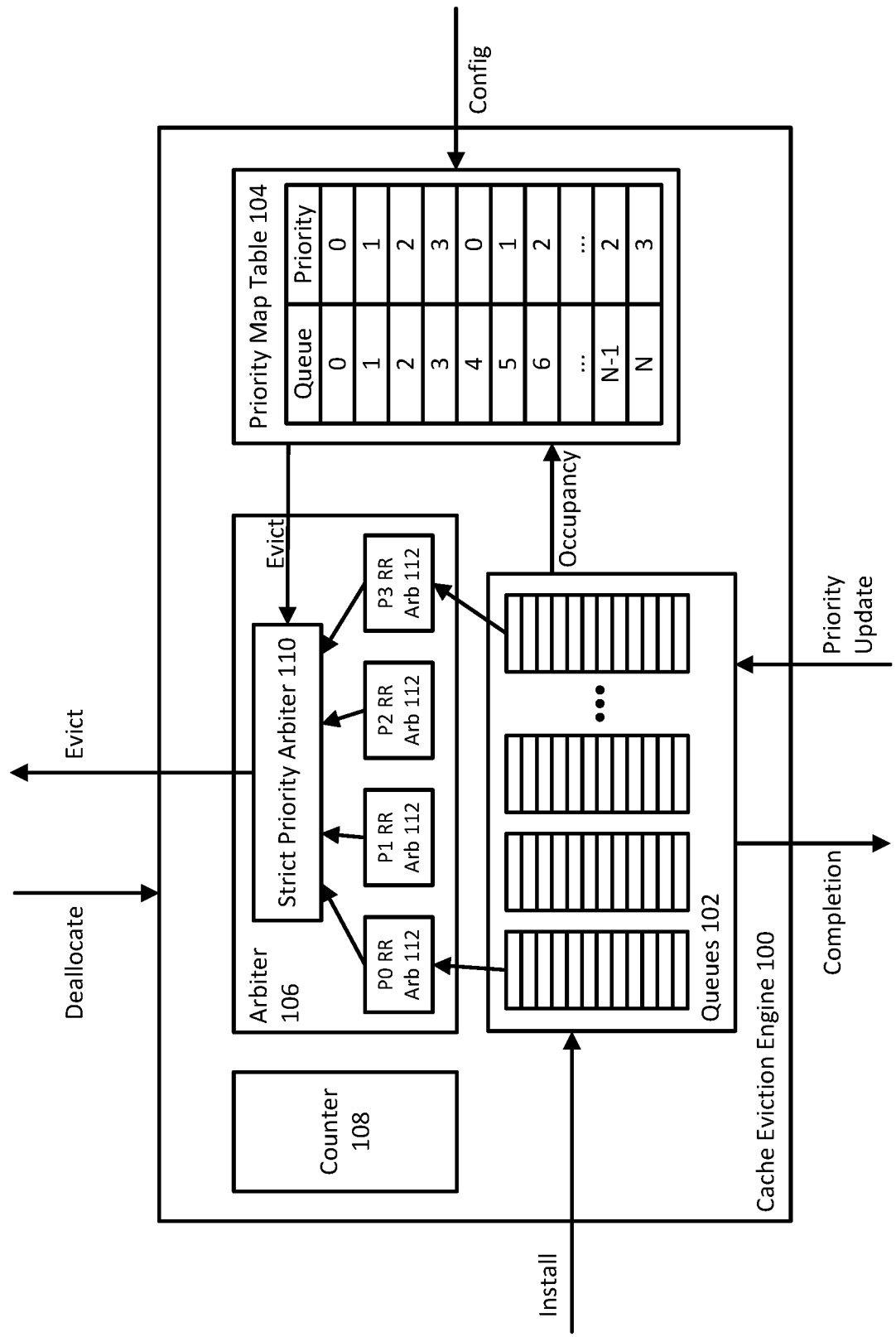
FIG. 1 depicts a block diagram of an example cache eviction engine for a network utilizing reliable transport protocols according to aspects of the disclosure.

The technology relates generally to a highly flexible and area efficient packet cache eviction engine for reliable transport protocols of networks. The eviction engine manages on-chip cache occupancy based on packet priority using various factors, such as resource usage time and/or host occupancy. The eviction engine evicts lower priority packets to off-chip memory and ensures that higher priority packets are kept on-chip, achieving higher performance and lower latency in processing packets.

An on-chip cache, such as a receiving (RX) packet cache, can buffer packets received by the reliable transport protocols in both ingress and egress directions. The on-chip cache can be SRAM and can manage on-chip data memory by writing, reading, evicting, and/or deallocating packets. To minimize silicon area while still providing high performance, the on-chip cache can be supported by off-chip memory, such as DRAM. Since the on-chip cache is relatively small in size, being optimized for lower latency and area, the eviction engine can monitor the on-chip cache buffer usage and evict packets from the on-chip cache to the off-chip memory when the buffer usage exceeds a threshold. The eviction engine can determine when and which packets to be evicted based on relative priorities of the packets in the on-chip cache, such as evicting older in time packets or packets known to be serviced later in time.

The eviction engine can include one or more interfaces to communicate with the on-chip cache. The on-chip cache can inform the eviction engine that a packet has been installed in the cache via an install interface. The eviction engine can inform the on-chip cache that the eviction engine has updated its queues with the installed packet using a completion interface. When a buffer corresponding to a packet has been freed up in the on-chip cache, the on-chip cache can inform the eviction engine to delete the context of that packet from its queues using a deallocate interface. The eviction engine can inform the on-chip cache that the eviction engine has updated its queues to delete the packet using the completion interface or a separate deallocate completion interface. The on-chip cache can inform the eviction engine to update a priority of individual packets or entire queues using a priority update interface. The eviction engine can inform the on-chip cache that the eviction engine has updated its queues to update the priority of individual packets or entire queues using the completion interface or a separate priority update completion interface. The eviction engine can inform the on-chip cache which packets to evict from the on-chip cache using an evict interface.

The eviction engine can include one or more interfaces to communicate with a configurable number of queues. The eviction engine can inform the queues to push a packet into the tail of the corresponding queue based on an input queue number using a push interface. The eviction engine can inform the queues to pop a packet from the head of a queue using a pop interface. The eviction engine can inform the queues to delete a packet from the queue using a delete interface.

The queues can be distributed to hosts connected to the network interface card (NIC) containing the on-chip cache. Hosts can correspond to processing devices, e.g., CPUs, that share the NIC. Distributing the queues to different hosts maintains isolation between packets belonging to different hosts, allowing for prioritizing or deprioritizing packets belonging to any particular host. The queues can be implemented as a double linked list, with next pointers, previous pointers, and packet information stored in on-chip memory, separate from the on-chip cache, for area and power efficiency.

A fixed number of queues can be generated for each host, where each queue can represent a priority. Queues in a host can be assigned different priority levels based on host and/or packet information, such as a type of connection and/or a type of packet. Depending on the host and/or packet information, the packets can be installed into different queues.

The queues allow for determining which packet is the oldest in a queue. The head of a queue can correspond to the oldest packet, and hence, a candidate for eviction within that queue as the oldest packet corresponds to the least recently used packet. The eviction engine can move a packet from its position in a queue to the tail of that same queue or any other queue, if that packet was accessed recently, thus changing its priority. Since each queue is associated with a priority, the queues further allow for determining which queue has the least priority, and hence, is a candidate for being selected for packet eviction.

The eviction engine can further include a configurable number of priorities and priority levels, programmed via configurable registers. The configurable registers can include an eviction register and a priority level register to configure the eviction engine to implement a particular eviction scheme, providing flexibility in how packets are prioritized and/or evicted.

A counter can keep track of availability in the on-chip cache, such as the total number of bytes occupied in the on-chip cache. Once the occupancy reaches a configurable threshold, a strict priority arbiter can select which queue to evict packets, starting with the lowest priority queue. If multiple queues have the same lowest priority, a round robin arbiter or random selection arbiter can arbitrate among those queues. A packet can be popped from the selected queue, the popped packet to be evicted from the on-chip cache to off-chip memory.

Each packet written to the on-chip cache can trigger an install event on the install interface to the eviction engine. Each installed packet can include a packet length, e.g., in bytes, and a unique index. Packet length can correspond to a size of a payload of the packet, a size of a payload plus headers of the packets, or a total size of the packet, as examples. Packets can be variable length or uniform length. Packets can also include part of a payload in one packet and a second part of the payload in another packet. The eviction engine can install the packet in the queues at the unique index. The packet length can be added to the counter that keeps track of the cache occupancy. After installation, the eviction engine can generate a completion event to the on-chip cache.

Each packet deallocated from the on-chip cache can trigger a deallocation event on the deallocate interface to uninstall the packet at the unique index in the queue. The queue can correspond to a list connecting packets in both forward and reverse direction, enabling deletion of a packet at any location, then stitching up the list using the next and previous pointers. This maintains the queuing order. The deallocated packet length can be reduced from the counter. Once a packet has been deleted, the packet is no longer a candidate for eviction.

The priority update interface can modify the priority of individual packets or entire sets of queues. Individual packet priorities can be updated when a packet is head of line and therefore needs to be in the on-chip cache to minimize latency of the overall packet processing pipeline, or a packet is receiver-not-ready (RNR), known to have a high inherent latency, and thus it is preferable to include in the off-chip memory. The priority update interface can provide the unique index of the packet whose priority needs to be modified. The eviction engine can delete the packet from the queue, then calculate an updated priority for the packet using the adjusted priority level register to increase or decrease the priority level of the corresponding host and/or packets by a configurable amount, map the priority to a new queue using the priority map table, and install the packet in the new queue.

For modifying the priority of all queues associated with a host, the eviction engine can read the priority of each queue of the host from the priority map table, update the priority of each queue using the configurable registers, and write back the updated priorities for the queues in the priority map table. Using configurable registers to alter the priority of individual packets or entire queues provides an efficient flexible mechanism for updating priorities while the on-chip cache is still processing packets.

The eviction engine includes the counter to track total packet length from all packets across all queues. The eviction engine can initiate an eviction scan when the total packet length is above a configurable threshold. The eviction engine can select a set of queues with the same least priority using the arbiter. The eviction engine can then select individual queues in a round robin fashion using the arbiter. The arbiter can send a pop request to each selected queue. The queue can pop a packet from the head of the queue. The eviction engine can present the popped packet to the on-chip cache as the candidate for eviction. For each packet that is evicted the occupancy counter decrements by the length of that packet. The arbiter continues to select queues until the counter reaches below another configurable threshold. This configurable threshold to stop the eviction scan can be the same or different from the configurable threshold that starts the eviction scan.

Eviction can also be triggered via a user request through the eviction interface. The on-chip cache can request a specific packet to be evicted through the priority update interface. The eviction engine can immediately pop the packet from the queue and remove the evicted packet from the on-chip cache.

FIG. 1 depicts a block diagram of an example cache eviction engine 100 for a network utilizing reliable transport protocols. The cache eviction engine 100 can be configured to manage on-chip cache occupancy using configurable packet priorities. The cache eviction engine 100 can evict lower priority packets to off-chip memory while maintaining higher priority packets in the on-chip cache. The network utilizing the reliable transport protocols can have higher performance and lower latency based on processing packets through the cache eviction engine 100. The cache eviction engine 100 can include a plurality of queues 102, a priority map table 104, and an arbiter 106. The cache eviction engine 100 can use control logic to manage packet flow, e.g., eviction, installation, and/or maintenance of packets in the on-chip memory.

The queues 102 can correspond to a configurable number of queues containing packets and/or packet information in the on-chip cache. The cache eviction engine 100 can include any number of queues. The queues 102 can also each have a configurable priority. The queues 102 can be distributed to different hosts for the on-chip cache to maintain isolation between packets belonging to different hosts. Maintaining isolation allows for prioritizing or deprioritizing packets for any of the hosts for the on-chip cache. Since each queue is associated with a priority, the queues 102 further allow for determining which queue is a candidate for packet eviction based on which queue has the lowest priority.

Each host can include one or more queues 102, where each queue can represent a priority. The queues 102 per host can have different priority levels based on information associated with the host and/or packets. The information associated with the host and/or packets can include type of connection, such as ordered or unordered connections, and/or type of packet, such as immediately serviced packets, packets scheduled with a delay, or packets having different packet processing rates. Depending on the information associated with the host and/or packets, the cache eviction engine 100 can install the packets into different queues 102.

For example, each host can include a set of 4 queues and each packet can contain information to which host the packet belongs, so that the packet is enqueued to one of the 4 queues that belong to its host. Each packet can additionally have an indication that specifies if the packet belongs to an ordered connection or an unordered connection. A configurable register, which can be included with the priority map table 104, can specify whether packets belonging to ordered connections have higher priority or not. Based on this configurable register, the ordered connection packets can be enqueued into one queue and the unordered connections into another queue.

Figure 2:
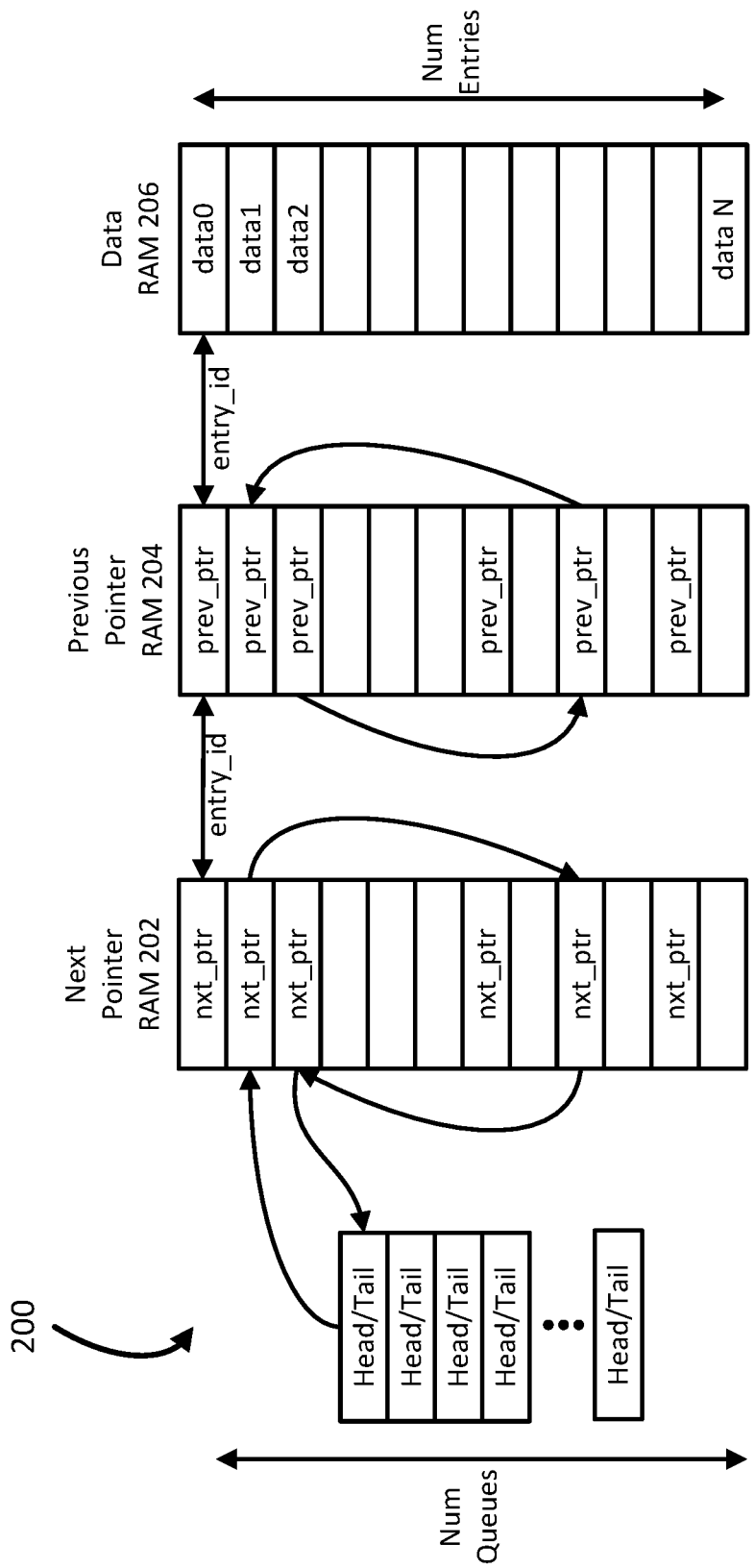
FIG. 2 depicts a block diagram of an example double linked list according to aspects of the disclosure.

As an example, the queues 102 can be implemented as a double linked list. FIG. 2 depicts a block diagram of an example double linked list 200. The double linked list can include next pointers 202, previous pointers 204, and packet information 206, which can be stored in on-chip memory, such as RAM. The on-chip memory for storing the next pointers 202, previous pointer 204, and packet information 206 can be separate from the on-chip cache to allow for area and power efficiency. The cache eviction engine 100 can use a push interface to configure the double linked list 200 to push a packet into a tail of a queue. The cache eviction engine 100 can use a pop interface to configure the double linked list 200 to pop a packet from a head of a queue. Popping a packet can correspond to evicting the packet from the on-chip cache to the off-chip memory. The cache eviction engine 100 can use a delete interface to configure the double linked list 200 to remove a packet from any position in the queue. Deleting a packet can correspond to removing the packet entirely, as opposed to evicting to off-chip memory, as that packet is no longer needed. The cache eviction engine 100 can use an update interface to configure the double linked list 200 to move a packet from a position in one queue to another position in that same queue or to any position in another queue.

The queues 102 can allow the cache eviction engine 100 to determine the age of a packet in a queue. The age of a packet can correspond to its most recent use or access. For example, the oldest packet within a queue can correspond to the least recently used or accessed packet within that queue. The oldest packet within a queue can be positioned at the head of that queue to be a candidate for eviction. If a packet was accessed or used recently, the cache eviction engine 100 can move that packet from its position in the queue to the tail of that same queue or to the tail of another queue.

Referring back to FIG. 1, the priority map table 104 is configured to maintain a mapping between the queues 102 and their respective priority levels. The cache priority map table 104 can include any number of queues and respective priorities. The priority map table 104 can include configurable registers to allow flexibility in how the cache eviction engine 100 prioritizes and/or evicts packets. For example, a client computing device can configure the registers in the priority map table 104 to implement a particular eviction scheme to include a particular number of priority levels for respective queues 102.

FIG. 3 depicts a table of example configurable registers 300. The configurable registers can include an eviction register 302 and a priority level register 304. The eviction register 302 can include a field for enabling eviction, such as evict_en. The eviction register 302 can further include fields for whether a number of packets in the cache is above or equal to a start eviction threshold, such as evict_thld_hi, and/or whether a number of packets in the cache is below or equal to a stop eviction threshold, such as evict_thld_lo. When the start eviction threshold is met, the eviction engine 100 can start evicting packets from the on-chip cache and can continue to evict packets until the number of packets falls below the stop eviction threshold. The start eviction threshold and the stop eviction threshold can be equivalent or different values.

The priority level register 304 can include an initial priority level register, such as pri_level_init_cfg, and/or an adjusted priority level register, such as pri_level_adj_cfg. The initial priority level register can program the initial priority level of each queue. The initial priority level can include fields for an initial value for the lowest priority level queue of a host, such as host_<n>_low, and/or fixed increments or gaps for subsequent priority level queues of the host, such as host_<n>gap. For example, given host_0_low=2 and host_0_gap=3, the initial priority assignment for the queues of host0 will be Q0=2, Q1=5, Q2=8, Q3=11. This provides flexibility in priority level assignment without needing additional configurable registers.

The adjusted priority level register can program priority adjustments based on cache occupancy. Cache occupancy can include total packets enqueued and dequeued or total bytes of data enqueued and dequeued. The adjusted priority level register can include fields for increasing or decreasing the priority level of corresponding host and/or packets by a configurable amount, such as case_<n>_inc and case_<n>_adj_value. For example, the cache eviction engine 100 can increase the priority level of a host and/or packet by the amount of case_<n>_adj_value if case_<n>_inc=1 while the cache eviction engine 100 can decrease the priority level by case_<n>_adj_value if case_<n>_inc=0.

Referring back to FIG. 1, the arbiter 106 is configured to determine which queues should evict packets when the cache occupancy reaches a threshold, such as the start eviction threshold. The cache eviction engine 100 can include a counter 108 to track the cache occupancy to determine when the cache occupancy reaches the threshold. The arbiter 106 can include a strict priority arbiter 110 and one or more round robin arbiters 112. The strict priority arbiter 110 can be configured to select one or more queues 102 from which to evict packets. The strict priority arbiter 110 can start with the lowest priority queues and, if the cache occupancy is still above the threshold, move to incrementally higher priority queues. The strict priority arbiter 110 can use the priority map table 104 to determine priorities for the queues 102. If multiple queues have the same priority, such as the same lowest priority, the one or more round robin arbiters 112 can select among the multiple queues with the same priority in a round-robin fashion. Alternatively or additionally, if multiple queues have the same priority, such as the same lowest priority, the arbiter can include one or more random selection arbiters (not shown) to randomly select among the multiple queues with the same priority. The arbiter 106 can pop one or more packets from the selected queue to be evicted from the on-chip cache to the off-chip memory.

The cache eviction engine 100 can communicate with the on-chip cache via one or more interfaces, such as an install interface, a completion interface, a deallocate interface, a priority update interface, and an evict interface. The cache eviction engine 100 can include an install interface for the on-chip cache to notify the cache eviction engine 100 that a packet has been added to the cache. The cache eviction engine 100 can include a completion interface for the cache eviction engine 100 to notify the on-chip cache that the queues 102 are updated with the added packet. The cache eviction engine 100 can include a deallocate interface for the on-chip cache to notify the cache eviction engine 100 to delete a packet from its queues, such as when a buffer corresponding to the packet has been freed up in the on-chip cache. The cache eviction engine 100 can include a priority update interface for the on-chip cache to notify the cache eviction engine 100 to update a priority of particular packets or entire queues. The priority update interface can request a per-host or per-packet based priority update. A per-host based update can change the priority for queues of a host while a per-packet based priority update can move a packet from one queue to another. The cache eviction engine 100 can include an evict interface to notify the on-chip cache which packets to evict from the on-chip cache.

Figure 4:
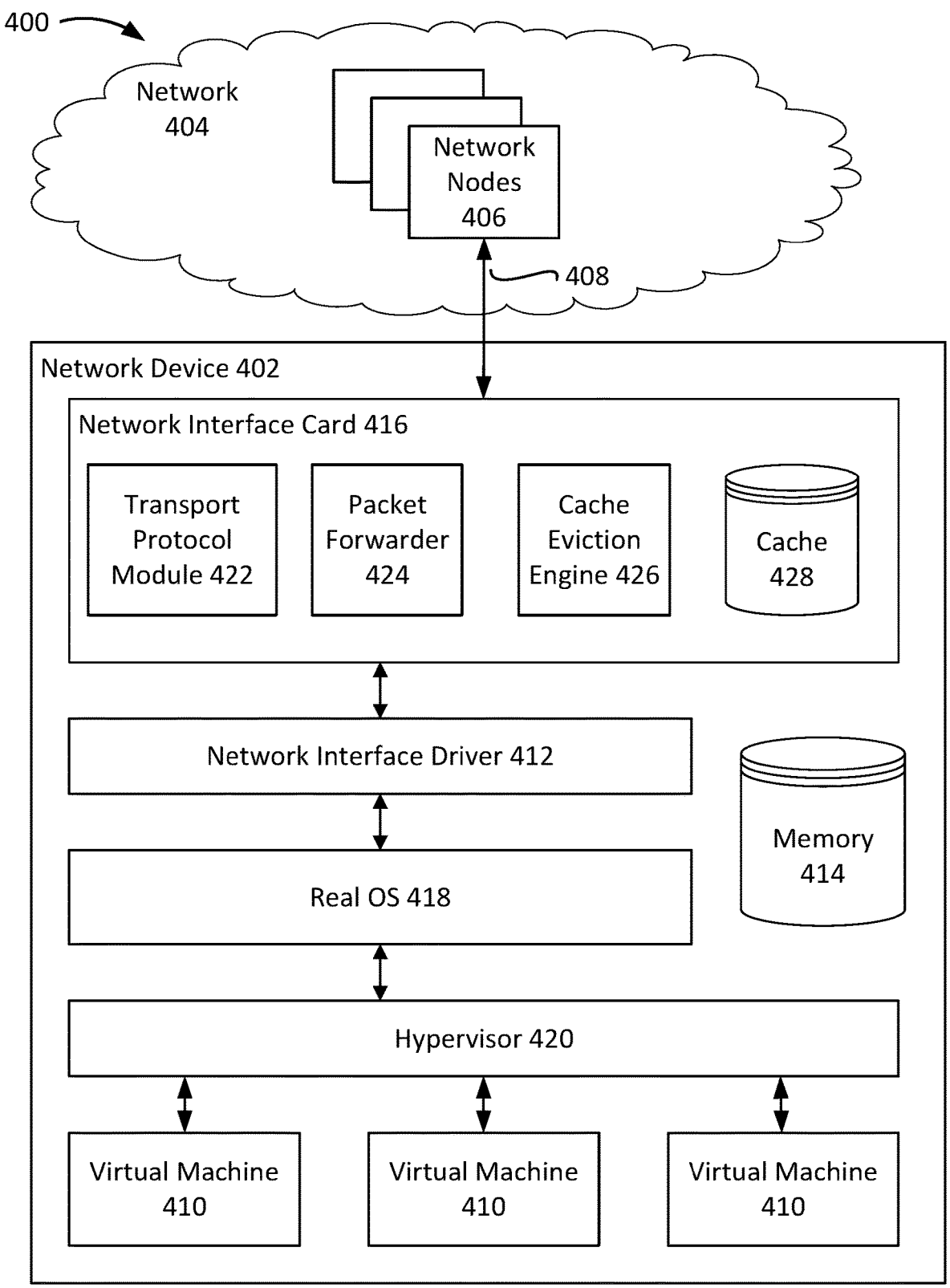
FIG. 4 depicts a block diagram of an example network environment with a network device according to aspects of the disclosure.

FIG. 4 depicts a block diagram of an example network environment 400 with a network device 402. The network environment 400 includes a network 404 of interconnected network nodes 406, including the network device 402 which can be one of the network nodes 406. The network nodes 406 participate in the network 404 as data sources, data destinations or data sinks, and/or intermediary nodes such as switches, routers, and/or gateways propagating data from sources towards destinations through the network 404. The network 404 includes the network device 402 with links 408 to various other participating network nodes 406.

The network 404 can facilitate interactions between participant devices. Example networks include the Internet, a local network, a network fabric, or any other local area or wide area network. The network 404 can be composed of multiple connected sub-networks or autonomous networks. The network 404 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 404. The network can be public, private, or a combination of public and private. In general, the network 404 can be used to convey information between computing devices, such as between the network nodes 406 and the network device 402.

The network device 402 can be a host device or server executing one or more virtual machines 410 on one or more processors of the network device 402. The network device 402 can include a network interface driver 412, off-chip memory 414, a network interface card 416, a real operating system (OS) 418, a hypervisor 420, and the virtual machines 410. The network device 402 can communicate with other network devices over the network 404. The network device 402 and other network devices can create or participate in one or more virtual networks to facilitate communication between virtual machines 410. The one or more virtual networks can overlay the physical network that makes up the network 404. Data packets can be routed within one of the virtual networks overlaying the physical network using a system of data packet encapsulation. The network device 402 and the network nodes 406 can route the data packets according to virtual Internet protocol addresses (VIPs) and media access control (MAC) addresses. In some examples, the network device 402 can host one or more virtual machines 410 that transmit data packets or receive data packets. In other examples, the network device 402 can be an intermediate node of a path between two virtual machines executing on two separate network devices. Accordingly, the network device 402 can act as a source, destination, or intermediate switch in one or more virtual networks.

The hypervisor 420 can manage operation of the virtual machines 410, including spinning up and terminating the virtual machines 410, managing allocation of off-chip memory 414 to the virtual machines 410, and live migrating the virtual machines 410 to other network devices.

The off-chip memory 414 can store data and/or computer executable instructions related to the operation and use of the network interface driver 412. For example, the memory 414 can store lower priority packets evicted from the on-chip cache. The memory 414 can include a high bandwidth memory (HBM), a dynamic random access memory (DRAM), a synchronous dynamic random access memory (SDRAM), and/or a flash memory, as examples.

The off-chip memory 414 can store computer executable instructions of a transport protocol module 422, such as a transmission control protocol (TCP) module or the TCP layer of a network stack, to be executed on a processor of the network device 402. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 412 can include a network interface driver software module running on the real OS 418. As an example, the network interface driver 412 can be a collection of computer executable instructions stored in the off-chip memory 414 that when executed by a processor help facilitate network communications. As another example, the network interface driver 412 can be implemented as logic in a hardware processor or other integrated circuit, or as a combination of hardware and software logic. The network interface driver 412 can communicate with one of the software virtual machines 410 directly or via a guest OS of the virtual machine 410 and/or the hypervisor 420.

The network interface driver 412 can be included within a layer of a network stack of the real OS 418 of the network device 402. In an example, the network interface driver 412 can be included within a data link layer of a network stack and can communicate with a software module or application that is included in an application layer of the network stack. In another example, the network interface driver 412 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a UDP module, RDP module, RUDP module, or a DCCP module. While not shown, the network interface driver 412 can be included as a portion of the network interface card 416.

The network interface card 416 can be configured to transfer data packets over a network protocol, such as a layer 2 protocol. The network interface card 416 can include a packet forwarder 424, a cache eviction engine 426, and an on-chip cache 428. The cache eviction engine 426 can correspond to the cache eviction engine 100 as depicted in FIG. 1.

The on-chip cache 428 can store data and/or computer executable instructions related to the operation and use of the network interface card 416. For example, the cache 428 can store a subset of higher priority packets from the off-chip memory 414. These packets can be fetched from the off-chip memory 414 or evicted to the memory 414. The on-chip cache 428 can buffer packets received by the transport protocol module 422 in both ingress and egress directions. The on-chip cache 428 can manage on-chip memory by writing, reading, evicting, and/or deallocating packets. The on-chip cache 428 can include a HBM, a DRAM, a SRAM, and/or a flash memory, as examples.

The packet forwarder 424 can be implemented in an application-specific integrated circuit (ASIC) or as software executing on a microprocessor. The packet forwarder 424 can receive packets for transmission from the virtual machines 410 and route them to one or more destination virtual machines executing on remote network devices. The packet forwarder 424 can also perform functions that allow the network interface card 416 to act as a destination for data packets received over the links 408. For example, the packet forwarder 424 can receive a data packet over one of the links 408, decapsulate the data packet, and forward the data packet to one or more destination virtual machines 410 executing on the network device 402. The packet forwarder 424 can transmit packets from the on-chip cache 428 and receive packets to store in the on-chip cache 428.

The cache eviction engine 426 can be implemented in an ASIC or as software executing on a microprocessor. The cache eviction engine 426 can manage installation, deallocation, priority updating, and/or eviction of packets from the on-chip cache 428. Since the on-chip cache 428 can be smaller in size compared to the off-chip memory 414 to optimize for lower latency and area, the eviction engine 426 can monitor the on-chip cache 428 occupancy and evict packets from the on-chip cache 428 to the off-chip memory 414 when the occupancy exceeds a threshold. The eviction engine 426 can determine when and which packets to be evicted based on relative priorities of the packets in the on-chip cache 428, such as evicting older in time packets or packets known to be serviced later in time.

Figure 5:
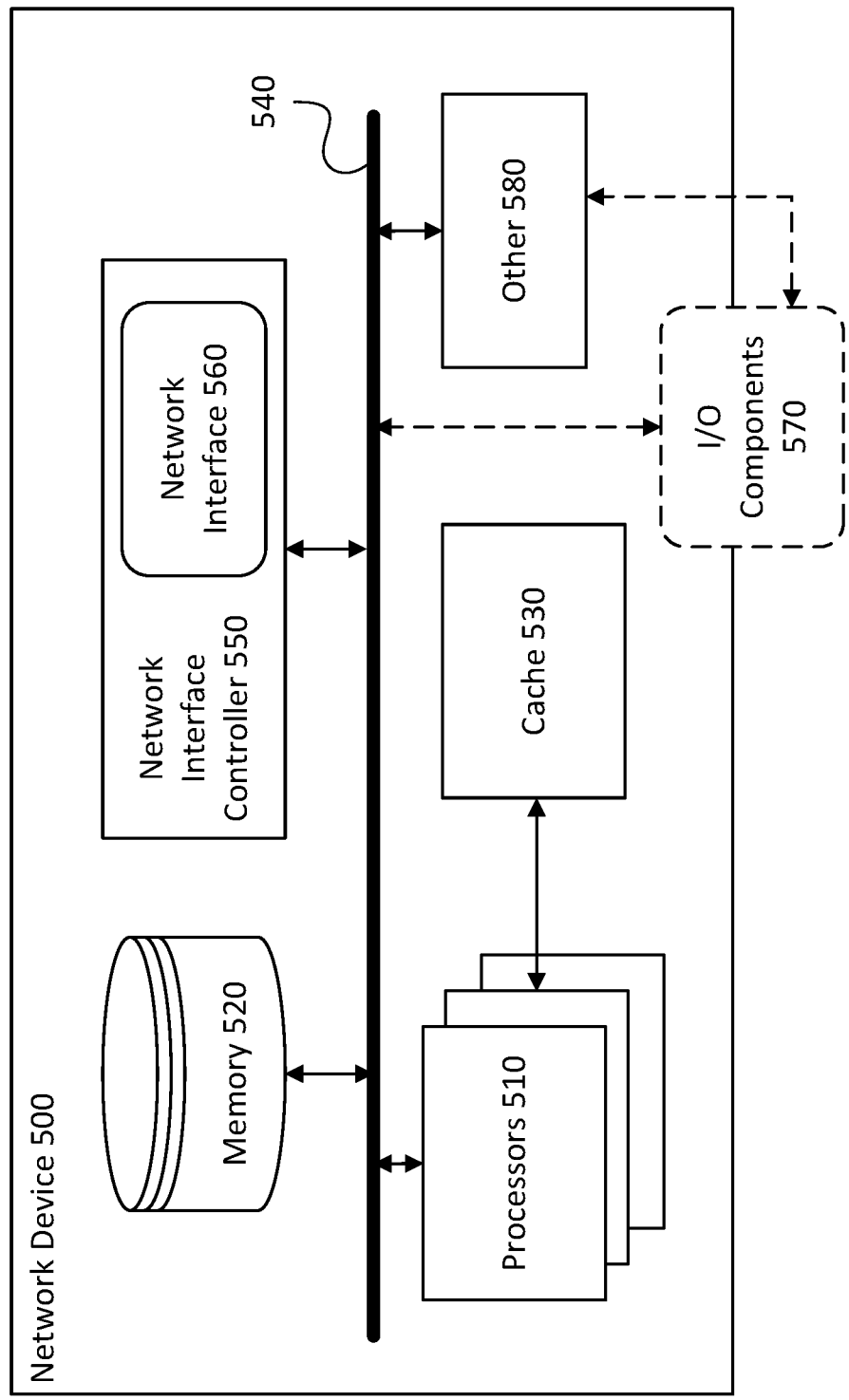
FIG. 5 depicts a block diagram of an example network device for a network according to aspects of the disclosure.

FIG. 5 depicts a block diagram of an example network device 500 for a network. The network device 500 can correspond to the network device 402 as depicted in FIG. 4. The network device 500 can include one or more processors 510 in communication with memory 520, at least one network interface controller 550 with a network interface port 560 for connection to a network, input/output (I/O) components 570, and other components 580. The processors 510 can be in communication with or connected to the memory 520, network interface controller 550, I/O components 570, and/or other components 580 via a bus 540. The processors 510 can incorporate or are connected to a cache memory 530. In some examples, instructions are read from the memory 520 into the cache memory 530 and executed by the processors 510 from the cache memory 530.

The processors 510 can be any logic circuitry that executes instructions fetched from the memory 520 or cache 530. The processors 510 can be microprocessor units or special purpose processors. The network device 500 can be based on any processor, or set of processors, capable of operating as described herein. The processors 510 can be single core or multi-core processors. The processors 510 can be multiple distinct processors. The processors 510 can be implemented as circuitry on one or more chips.

The memory 520 can be any device suitable for storing computer readable data. The memory 520 can be a device with fixed storage or a device for reading removable storage media. Examples include all forms of non-volatile memory, media and memory devices, semiconductor memory devices, e.g., erasable programmable read-only memory (EPROM), electrically EPROM (EEPROM), SDRAM, and flash memory devices, magnetic disks, magneto-optical disks, and optical discs, e.g., CD ROM, DVD-ROM, or Blu-Ray® discs. The network device 500 can have any number of memory devices 520.

The cache memory 530 can be a form of computer memory placed in close proximity to the processors 510 for fast access times. The cache memory 530 can be part of, or on the same chip as, the processors 510. There can be multiple levels of cache 530, e.g., level 2 and level 3 cache layers.

The network interface controller 550 can manage data exchanges via the network interface 560. The network interface controller 550 can handle the physical and data link layers of the open systems interconnection (OSI) model for network communication. Some of the tasks of the network interface controller 550 can be handled by one or more of the processors 510. The network interface controller 550 can be incorporated into the processors 510, such as circuitry on the same chip.

The network device 500 can have multiple network interfaces 560 controlled by a single controller 550 or multiple network interface controllers 550. Each network interface 560 can be a connection point for a physical network link, e.g., a cat-5 or cat-6 Ethernet link. The network interface controller 550 can support wireless network connections and an interface port 560 can be a wireless, e.g., radio, receiver/transmitter. The network interface controller 550 can implement one or more network protocols such as Ethernet. The network device 500 can exchange data with other network devices via physical or wireless links through the network interface 560. The network interface 560 can link directly to another device or to another device via an intermediary device, e.g., a hub, a bridge, a switch, or a router, connecting the network device 500 to a data network such as the Internet.

The network device 500 can include, or provide interfaces for, one or more input or output (I/O) components 570. Input devices can include keyboards, microphones, touch screens, sensors, and pointing devices, such as a mouse or trackball, as examples. Output devices can include video displays, speakers, and printers, as examples.

Other components 580 can include an I/O interface, external serial device ports, and any additional co-processors. For example, the network device 500 can include an interface, e.g., a universal serial bus (USB) interface, for connecting input devices, output devices, or additional memory devices, e.g., portable flash drive or external media drive. The network device 500 can include an additional co-processor, such as a math co-processor to assist the processors 510 with high precision or complex calculations.

Figure 6:
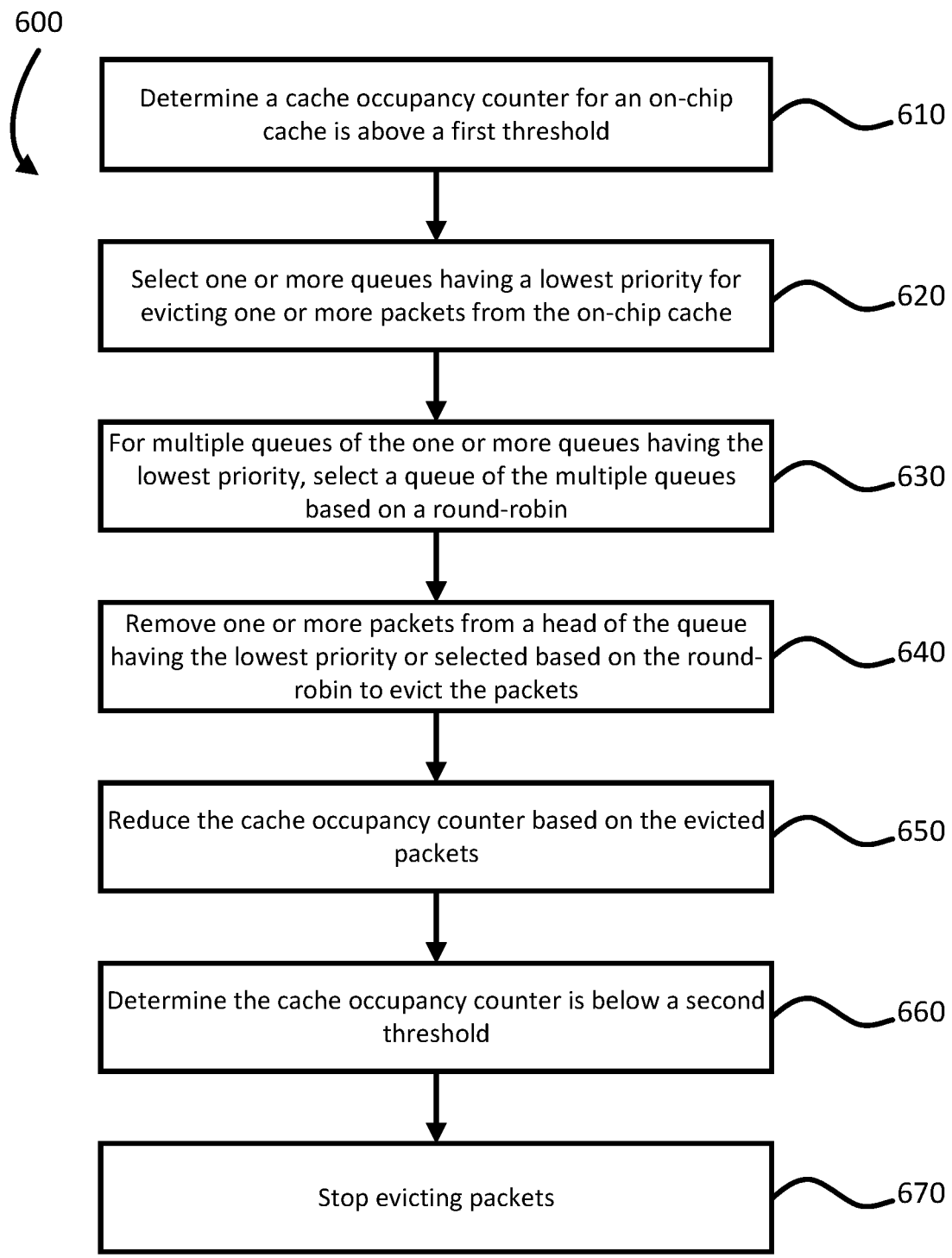
FIG. 6 depicts a flow diagram of an example process for evicting packets from an on-chip cache to off-chip memory according to aspects of the disclosure.

FIG. 6 depicts a flow diagram of an example process 600 for evicting packets from an on-chip cache to off-chip memory. The example process 600 can be performed on a system of one or more processors in one or more locations, such as the example cache eviction engine 100 as depicted in FIG. 1.

As shown in block 610, the cache eviction engine 100 can determine a cache occupancy counter for an on-chip cache is above a first threshold. The cache eviction engine 100 can track a total packet length of all packets across all queues, representing the packets stored in the on-chip cache. Packet length can correspond to a size of a payload of the packet, a size of a payload plus headers of the packets, or a total size of the packet, as examples. The cache eviction engine 100 can start evicting packets when the total packet length is above the first threshold. The first threshold can be configurable based on the size of the on-chip cache.

As shown in block 620, the cache eviction engine 100 can select one or more queues having a lowest priority for evicting one or more packets from the on-chip cache. The cache eviction engine 100 can select a set of queues with the same least priority using an arbiter. As shown in block 630, for multiple queues of the one or more queues having the lowest priority, the cache eviction engine 100 can select a queue of the multiple queues based on a round-robin. The cache eviction engine 100 can select individual queues of the set of queues with the same least priority in a round robin fashion using the arbiter.

As shown in block 640, the cache eviction engine 100 can remove one or more packets from a head of the queue having the lowest priority and/or selected based on the round-robin to evict the one or more packets. The cache eviction engine 100 can send a pop request to each selected queue to pop a packet from the head of the queue. The cache eviction engine 100 can report the popped packet to the on-chip cache so the popped packet can be evicted.

As shown in block 650, the cache eviction engine 100 can reduce the cache occupancy counter based on the evicted packets. The cache eviction engine 100 can decrement the cache occupancy counter for each packet that is evicted by the length of that packet.

The cache eviction engine 100 can continue to select queues and pop packets until, as shown in block 660, the cache eviction engine 100 can determine the cache occupancy counter is below a second threshold. The second threshold can also be configurable based on the size of the on-chip cache. The first and second thresholds can be equivalent values or different values.

As shown in block 670, the cache eviction engine 100 can stop evicting packets. The cache eviction engine 100 can stop selecting queues and popping packets for eviction based on the queue selected.

The cache eviction engine 100 can also evict packets based on a request received from a client computing device. The request can be to select queues having the lowest priority, as described above, or can include a specific packet to be evicted. If the request includes a specific packet, the cache eviction engine 100 can immediately remove the packet from its queue and evict the packet from the on-chip cache.

Figure 7:
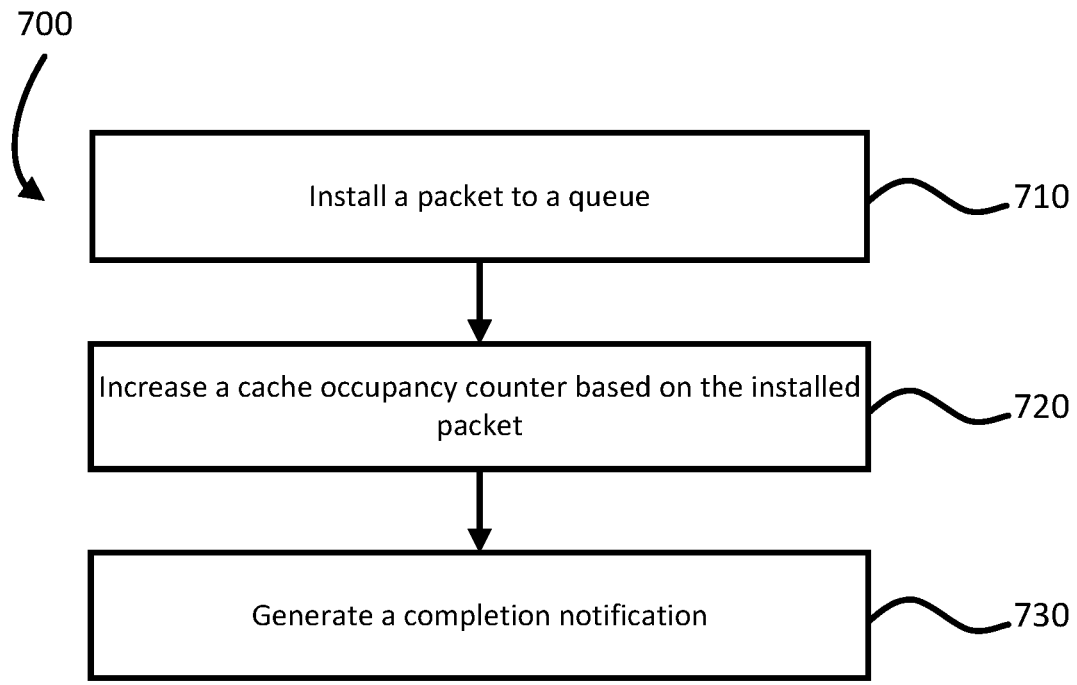
FIG. 7 depicts a flow diagram of an example process for installing packets for the on-chip cache according to aspects of the disclosure.

FIG. 7 depicts a flow diagram of an example process 700 for installing packets for the on-chip cache. The example process 700 can be performed on a system of one or more processors in one or more locations, such as the example cache eviction engine 100 as depicted in FIG. 1.

As shown in block 710, the cache eviction engine 100 can install a packet to a queue. The packet can include a packet length, such as in bytes, and a unique index to identify the packet. The cache eviction engine 100 can determine a priority of the packet and install the packet in queues based on the determined priority to add the packet to its appropriate priority level queue with the unique index.

As shown in block 720, the cache eviction engine 100 can increase a cache occupancy counter based on the installed packet. The cache eviction engine 100 can add the packet length to the cache occupancy counter to monitor the on-chip cache.

As shown in block 730, the cache eviction engine 100 can generate a completion notification to send to the on-chip cache to inform the on-chip cache that the packet was installed in its queue so the packet can be added to the on-chip cache.

Figure 8:
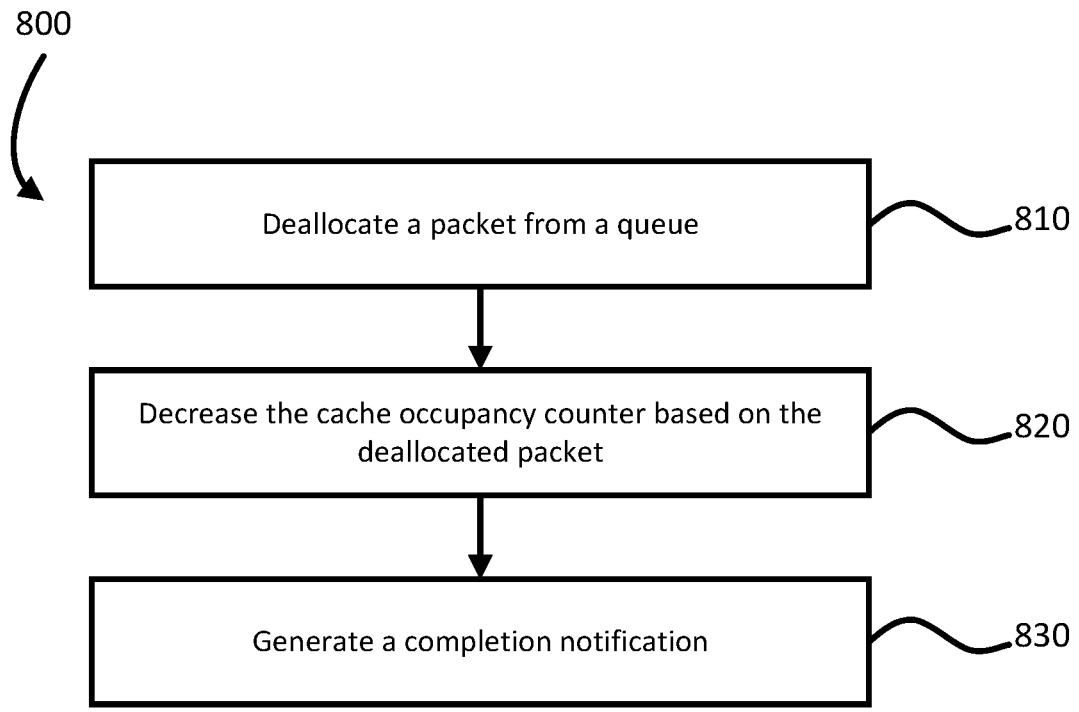
FIG. 8 depicts a flow diagram of an example process for deallocating packets for the on-chip cache according to aspects of the disclosure.

FIG. 8 depicts a flow diagram of an example process 800 for deallocating packets for the on-chip cache. The example process 800 can be performed on a system of one or more processors in one or more locations, such as the example cache eviction engine 100 as depicted in FIG. 1.

As shown in block 810, the cache eviction engine 100 can deallocate a packet from a queue. The cache eviction engine 100 can uninstall the packet at its unique index in the queue. Packets can be connected in both forward and reverse direction to enable deallocating the packet from any position in the queue. The cache eviction engine 100 can stitch up the queue using the next and previous pointers to maintain queueing order.

As shown in block 820, the cache eviction engine 100 can decrease a cache occupancy counter based on the deallocated packet. The cache eviction engine 100 can remove the packet length to the cache occupancy counter as the cache eviction engine 100 monitors the on-chip cache.

As shown in block 830, the cache eviction engine 100 can generate a completion notification to send to the on-chip cache to inform the on-chip cache that the packet was deallocated from its queue, so the packet is no longer a candidate for eviction.

Figure 9:
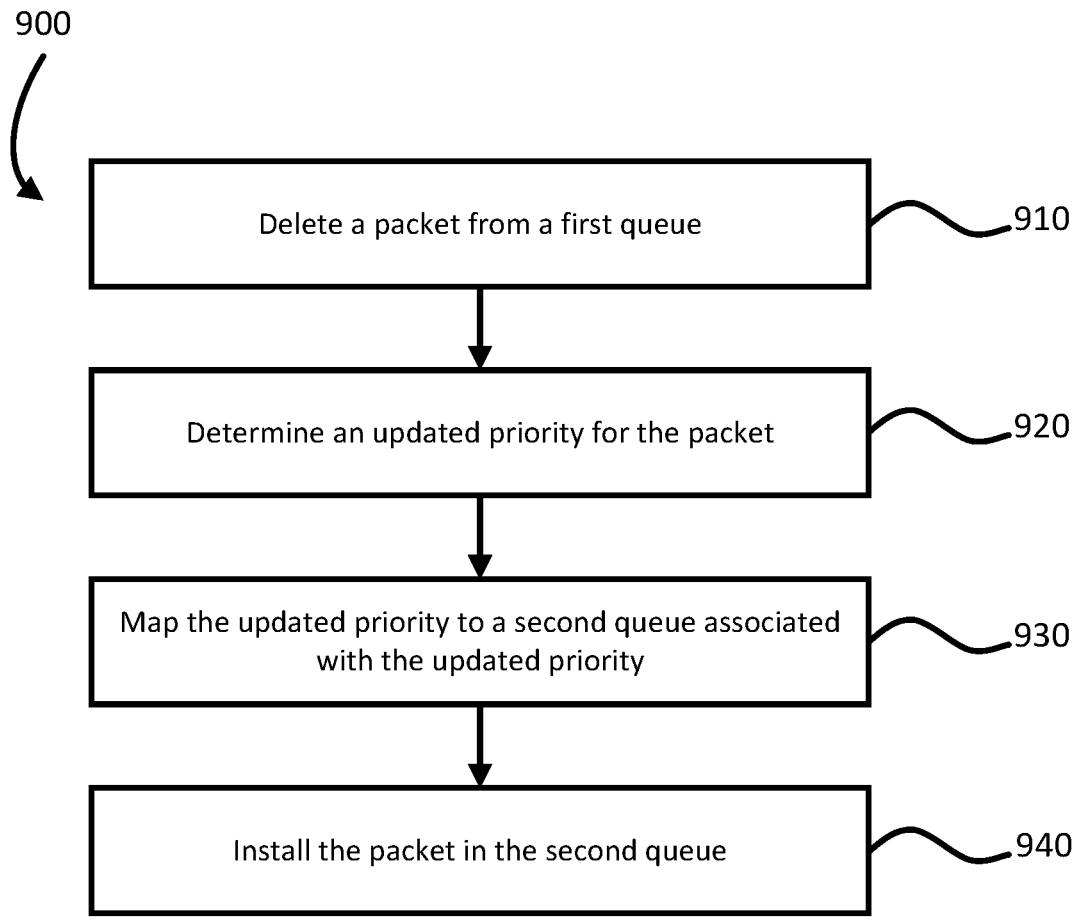
FIG. 9 depicts a flow diagram of an example process for updating a priority for a packet according to aspects of the disclosure.

FIG. 9 depicts a flow diagram of an example process 900 for updating a priority for a packet. The example process 900 can be performed on a system of one or more processors in one or more locations, such as the example cache eviction engine 100 as depicted in FIG. 1. As examples, packet priority can be updated when a packet is head of line but needs to be in the on-chip cache to minimize latency of the overall packet processing pipeline or when a packet has a high inherent latency and should be included in the off-chip memory.

As shown in block 910, the cache eviction engine 100 can delete a packet from a first queue based on a received unique index of the packet whose priority is being modified.

As shown in block 920, the cache eviction engine 100 can determine an updated priority for the packet. The cache eviction engine 100 can calculate an updated priority using an adjusted priority level register to increase or decrease the priority level of the packet by a configurable amount.

As shown in block 930, the cache eviction engine 100 can map the updated priority to a second queue associated with the updated priority. The cache eviction engine 100 can use the priority map table to determine the second queue associated with the updated priority.

As shown in block 940, the cache eviction engine 100 can install the packet in the second queue.

The cache eviction engine 100 can also update the priority of all queues associated with a host as opposed to an individual packet. The cache eviction engine 100 can read the priority of each queue of the host from the priority map table. The cache eviction engine 100 can update the priority of each queue using the configurable registers, such as the adjusted priority level registers. The cache eviction engine 100 can write back the updated priorities for the queues in the priority map table. Using configurable registers to alter the priority of individual packets or entire queues provides an efficient flexible mechanism for updating priorities while the on-chip cache is still processing packets.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for evicting packets from an on-chip cache to off-chip memory, the method comprising:
   determining, by one or more processors, an occupancy counter of the on-chip cache is above a first threshold;
   selecting, by the one or more processors, a queue having a lowest priority from a plurality of queues, each queue of the plurality of queues having a configurable priority;
   removing, by the one or more processors, a packet from a head of the selected queue to evict the packet from the on-chip cache; and
   reducing, by the one or more processors, the occupancy counter based on a length of the packet being removed.

2. The method of claim 1, further comprising:
   determining, by the one or more processors, the occupancy counter is below a second threshold; and
   stopping, by the one or more processors, eviction of packets from the on-chip cache.

3. The method of claim 2, wherein the first threshold and the second threshold are equivalent.

4. The method of claim 1, wherein the occupancy counter tallies a total packet length of packets being stored in the on-chip cache.

5. The method of claim 1, further comprising:
   selecting, by the one or more processors, multiple queues having the lowest priority; and
   selecting, by the one or more processors, a queue of the multiple queues based on a round-robin.

6. The method of claim 1, further comprising:
   installing, by the one or more processors, a packet to a queue; and
   increasing, by the one or more processors, the occupancy counter based on a length of the packet being installed.

7. The method of claim 1, further comprising:
   deallocating, by the one or more processors, a packet from a queue; and
   reducing, by the one or more processors, the occupancy counter based on a length of the packet being deallocated.

8. The method of claim 1, further comprising updating, by the one or more processors, a priority for a packet by:
   deleting the packet from a first queue;
   determining an updated priority for the packet using a configurable register;
   mapping the updated priority to a second queue associated with the updated priority; and
   installing the packet in the second queue.

9. The method of claim 1, further comprising updating, by the one or more processors, priorities for multiple queues by:
   reading the priorities from a priority map table;
   determining updated priorities using a configurable register; and
   writing the updated priorities to the priority map table.

10. The method of claim 1, wherein the queue is implemented as a double linked list.

11. A system comprising:
    one or more processors; and
    one or more storage devices coupled to the one or more processors and storing instructions that, when executed by the one or more processors, cause the one or more processors to perform operations for evicting packets from an on-chip cache to off-chip memory, the operations comprising:
    determining an occupancy counter of the on-chip cache is above a first threshold;
    selecting a queue having a lowest priority from a plurality of queues, each queue of the plurality of queues having a configurable priority;
    removing a packet from a head of the selected queue to evict the packet from the on-chip cache; and
    reducing the occupancy counter based on a length of the packet being removed.

12. The system of claim 11, wherein the operations further comprise:
    determining the occupancy counter is below a second threshold; and
    stopping eviction of packets from the on-chip cache.

13. The system of claim 11, wherein the operations further comprise:
    selecting multiple queues having the lowest priority; and
    selecting a queue of the multiple queues based on a round-robin.

14. The system of claim 11, wherein the operations further comprise:
    installing a packet to a queue; and
    increasing the occupancy counter based on a length of the packet being installed.

15. The system of claim 11, wherein the operations further comprise:
    deallocating a packet from a queue; and
    reducing the occupancy counter based on a length of the packet being deallocated.

16. The system of claim 11, wherein the operations further comprise updating a priority for a packet by:
    deleting the packet from a first queue;
    determining an updated priority for the packet using a configurable register;
    mapping the updated priority to a second queue associated with the updated priority; and
    installing the packet in the second queue.

17. The system of claim 11, wherein the operations further comprise updating priorities for multiple queues by:
    reading the priorities from a priority map table;
    determining updated priorities using a configurable register; and
    writing the updated priorities to the priority map table.

18. A non-transitory computer readable medium for storing instructions that, when executed by one or more processors, cause the one or more processors to perform operations for evicting packets from an on-chip cache to off-chip memory, the operations comprising:
    determining an occupancy counter of the on-chip cache is above a first threshold;
    selecting a queue having a lowest priority from a plurality of queues, each queue of the plurality of queues having a configurable priority;
    removing a packet from a head of the selected queue to evict the packet from the on-chip cache; and
    reducing the occupancy counter based on a length of the packet being removed.

19. The non-transitory computer readable medium of claim 18, wherein the operations further comprise:
    determining the occupancy counter is below a second threshold; and
    stopping eviction of packets from the on-chip cache.

20. The non-transitory computer readable medium of claim 18, wherein the operations further comprise:
    selecting multiple queues having the lowest priority; and
    selecting a queue of the multiple queues based on a round-robin.

* * * * *